Nov. 21, 1967 S. A. GUERRIERI 3,353,906
METHOD OF RECOVERING CHEMICALS FROM SPENT PULPING LIQUORS
Filed Aug. 25, 1964
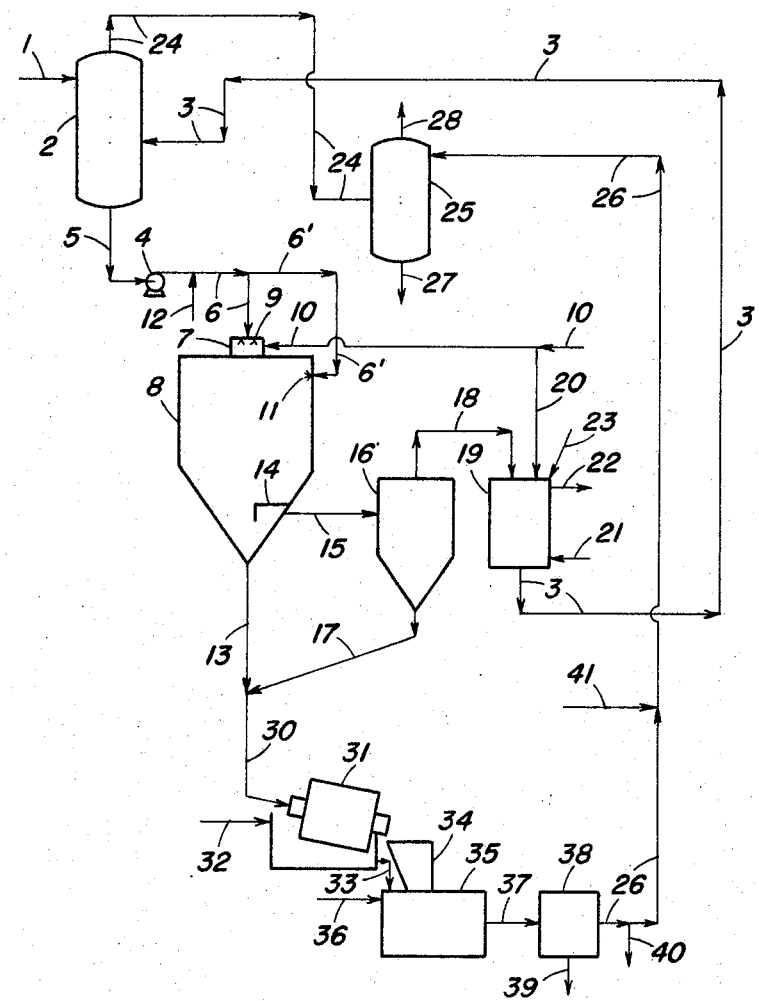
INVENTOR
Salvatore A. Guerrieri
BY
FLYNN, MARNY & JANGARATHIS
ATTORNEY

United States Patent Office 3,353,906
Patented Nov. 21, 1967

3,353,906
METHOD OF RECOVERING CHEMICALS FROM SPENT PULPING LIQUORS
Salvatore A. Guerrieri, Rowayton, Conn., assignor to The Lummus Company, New York, N.Y., a corporation of Delaware
Filed Aug. 25, 1964, Ser. No. 391,894
The portion of the term of the patent subsequent to June 6, 1984, has been disclaimed
10 Claims. (Cl. 23—48)

This invention relates to a process for recovering chemicals from spent pulping liquors and, more specifically, for recovering metal and sulfur values therefrom with a minimum of hazard and pollution to streams and the atmosphere.

Sulfite wood pulping with calcium sulfite used in the digestion of wood chips and other cellulosic matter is widely practiced in the United States, Canada and other areas. Since calcium sulfite is inexpensive and since suitable recovery processes for spent calcium sulfite liquors have not yet been developed, it is common practice to dispose of the spent liquor by releasing it to nearby streams and other water bodies. This practice causes severe water pollution in many instances. Sulfite pulp producers, therefore, are confronted with alternative but difficult choices. A mill can be converted to a kraft mill, provided the mill's line of pulps can be made by the kraft process. Unfortunately, the kraft process provides relief for the water pollution problem, but it is characterized by air pollution and associated problems. Other alternatives include conversion to a sodium base or ammonia base sulfite operation, wherein both stream and air pollution are substantially avoided. Here again, however, there are other disadvantages. For example, the relatively high cost of ammonia and an associated recovery system has militated against its use.

A sulfite process based upon the use of sodium sulfite is advantageous in the quality and yield of pulp. Yet, the use of sodium sulfite has also been limited by the relatively expensive and complicated systems developed for recovery of the pulping chemicals. For example, a kraft-type recovery furnace equipped with boiler tubes carrying water may be employed as the primary recovery unit. Such furnaces are expensive, and occasionally a tube has burst in operation, with water dropping into the molten smelt and pile of burning solids at the bottom of the furnace. The resultant explosion severely damaged the furnace. As indicated, the furnaces are expensive; when coupled with an expensive and complicated secondary recovery or conversion process, the total process becomes unattractive, despite any other advantages.

A simple, economical sulfite liquor recovery process free from a conventional recovery boiler or furnace, and free from water and air pollution problems is, therefore, much desired today in the paper and pulp industry. The present invention is predicated upon such a process.

It is an object of this invention, therefore, to recover metal and sulfur values from a spent cooking liquor. A primary object is to provide such a recover economically and simply without substantial hazard or pollution to either water or air. Another object is to recover alkali metal and sulfur values in the form of an alkaline earth metal sulfite or bisulfite. Other objects of the invention will be apparent from the following description taken in conjunction with the accompanying drawing.

The drawing constitutes a schematic flow diagram illustrating a preferred embodiment of the invention for recovery of sodium and sulfur values of a concentrated black liquor in the form of a sodium sulfite liquor.

In accordance with the invention, and with reference to the drawing, a concentrated black liquor (50–55% solids, in the case of sodium-based liquors) from multiple-effect evaporators (not shown) is passed from line 1 to direct contact evaporator 2 wherein it is contacted with hot effluent combustion products, described hereinafter, where are introduced into evaporator 2 via line 3. The liquor is further concentrated to about 60 to 65% solids and is heated in evaporator 2 by virtue of such contact. Liquor is pumped from evaporator 2 by means of pump 4 and lines 5 and 6, and is introduced into burner 7 positioned at the top of reactor 8 through one or more spray nozzles 9. Air, preheated, if desired, is introduced into burner 7 through line 10. The resulting mixture in burner 7 flows into the top of reactor 8. Preferred for use as burner 7 is a Lummus Vortex Burner, as described in U.S. Patent Nos. 2,560,074; 2,560,076 and 2,560,078.

Air is charged to the burner 7 in sufficient amount to maintain combustion of the black liquor in reactor 8, preferably at a temperature from about 1700° F. to about 2000° F., a temperature substantially above the melting point of the resulting solid products of reaction. However, the quantity of air is such that a reducing, rather than an oxidizing, atmosphere prevails in reactor 8. Air is supplied in such quantity as to burn only enough of the solids in the black liquor to supply the heat required to vaporize the water present in the black liquor, to heat the water vapor and solids thus formed to reaction temperature, and to decompose the said solids to form combustion products which are removed from the lower part of reactor 8. As an alternate and less preferred procedure, a portion of the black liquor is charged from line 6, to burner 7 through nozzle 9 to the reactor 8 while the remaining portion of the total black liquor charge is introduced via line 6' and one or more spray nozzles 11 to reactor 8 slightly below burner 7. Generally, about 40% to about 95% of the total air required for complete combustion is at this point in the process.

As another modification, in pulping operations requiring high pulp yields, the carbonaceous material in the black liquor in line 6 may be insufficient to maintain the desired reducing atmosphere and sufficiently elevated temperature in reactor 8, in which case supplemental fuel is charged through line 12 for admixture with the black liquor in line 6. The supplemental fuel can be a fuel oil or a hydrocarbon gas, whichever is available and economical.

In reactor 8, the products of combustion and reaction comprise, which is primarily sodium carbonate, and gases, which include water vapor, carbon dioxide, carbon monoxide, saturated and unsaturated hydrocarbons, hydrogen sulfide and hydrogen. The combustion and reaction products flow downwardly through reactor 8. The smelt formed in reactor 8 is removed through line 13, and is at a temperature of about 1700° F. or greater.

The gases leaving reactor 8 are directed past baffle 14 to exit line 15, through which they are passed to separator 16. The latter is preferably a cyclone separator in which any entrained solids are separated for removal through line 17 for admixture with the smelt in line 13. Combustion gases substantially free of solids are passed from separator 16 through overhead line 18 into waste heat boiler 19, into which air is also passed from line 20 in order to complete the combustion of the gaseous products from reactor 8 and to convert hydrogen sulfide in the gases to sulfur dioxide. Heat developed in boiler 19 is recovered in the form of steam, with boiler feed water being introduced into boiler tubes (not shown) through line 21 and steam being removed via line 22. Sulfur can also be burned in boiler 19 as required to make up for losses; if such is required, sulfur can be introduced via line 23.

Gases are taken from boiler 19 through line 3; the gases comprise sulfur dioxide, water vapor, carbon dioxide, nitrogen and any excess air. Such gases are passed through line 3 and are introduced into the direct contact evaporator 2 wherein they serve as a hot effluent contact, as described above. Cooled combustion gases are removed from evaporator 2 through line 24 and are introduced into a lower section of recovery or sulfiting tower 25, wherein the gas is first scrubbed and further cooled by countercurrent contact with water in a lower section. The gas then passes into an intermediate section of tower 25 wherein sulfur dioxide is recovered by contact with green liquor (aqueous sodium carbonate solution) introduced via line 26. The quantity of green liquor used in tower 25 can be varied to suit the subsequent cooking operation for which the neutral or acid sulfide formed in tower 25 is used, after removal via line 27. Gases substantially free of sulfur dioxide are removed from tower 25 through overhead line 28, and can be vented to the atmosphere without causing any material pollution problem.

Sulfiting tower 25 is preferably comprised of three zones. The bottom zone (not shown) is a heat exchange zone, to which concentrated black liquor is charged from evaporator 2 for further concentration. This zone serves to further cool hot gases introduced through line 24 while also concentrating the black liquor by evaporation of additional water and supplements the function of evaporator 2. An intermediate zone (not shown) is a final cooling zone wherein gases from line 24 are cooled by direct contact with recirculated cooling water. This zone also serves as a purifying section to remove final traces of impurities in the gas and to prevent them from getting into the cooking liquor, which is prepared in the next zone. The top zone, shown as tower 25, serves as a reaction zone wherein sodium carbonate is converted to sodium sulfite or to sodium acid sulfite with the sulfur dioxide in the gases. The concentrated black liquor in the tower bottom (not shown) can be fed to the top of reactor 8. Whether supplied in a single, three-zone tower as just described, or as shown in the drawing, gases in line 3 can be routed directly to recovery tower 25 through line 24.

Referring now to the combined smelt in line 30, formed from the smelts in lines 13 and 17, the combined material is passed into the ball mill generally indicated as 31. The ball mill preferably contains a relatively large amount of pulverized smelt and is arranged to rotate in a flowing pool of water to remove sensible heat of the smelt, with cool water being introduced through line 32 and warmer water being removed via line 33. It is to be understood that a flaker or similar device can be used in place of the ball mill, in order to cool and comminute the smelt prior to dissolving it. As the smelt drops into the relatively cool, pulverized product in ball mill 31, it is rapidly cooled to a temperature below its melting point and, in the mill, such lumps as are generally formed are broken down by the balls of the mill as the drum thereof rotates. The cooled and pulverized product flows from mill 31 into funnel or feed member 34 of dissolver 35. Warm water in line 33 can be used to dissolve the product in dissolver 35. Additional water, if required, is charged through line 36 to the dissolver. In dissolver 36, a green liquor comprising sodium carbonate is formed and is then passed through line 37 into clarifier 38, if necessary. Any dregs are removed from the system through line 39. The clarified solution in 38 is passed through line 26 to storage (not shown) or directly to an upper section of recovery or sulfiting tower 25. As an alternative, a portion of the clarified green liquor in line 26 can be so directed to tower 25 and another portion can be routed through line 40 to a digester (not shown) for use in the digestion of wood chips or other cellulosic material.

As a modification, the combined smelt in line 30 can follow present practice and be charged directly (not shown) to dissolver 35. However, since the smelt is at an elevated temperature of about 1700° F., minor and, at times, major explosions occur in the dissolver. Accordingly, to avoid such hazards it is more advantageous to include a cooling operation as described herein.

The procedure described in connection with the drawing can generally be followed with calcium or magnesium base black liquors. In order to assure conversion of metal lignosulfonates and the like in the black liquor to the corresponding metal oxide, the temperature in reactor 8 should be greater than the decomposition of the carbonate of the metal. For example, with a calcium base black liquor, the temperature should be above about 1517° F., at atmospheric pressure.

When a calcium or magnesium base black liquor is processed, the residue recovered in line 30 is solid calcium or magnesium oxide and cooler 31 need not be used. The oxide flows directly from line 30 into dissolver 35 and is converted with water in dissolver 36 to the corresponding hydroxide. The liquor thus formed, containing some solid hydroxide in suspension is then routed through line 26 to sulfiting tower 25 for formation of calcium or magnesium sulfite, respectively.

Air has been shown for use as a combustion gas in burner 7, reactor 8 and waste heat boiler 19. It is to be understood that oxygen can be used in place of, or in admixture with, air. However, air is preferred in view of its much lower cost. The dilution effect of nitrogen upon the desired combustion gases is small and not disadvantageous; in fact it is advantageous for the conversion of the calcium or magnesium carbonate to the oxide. Broadly, a free-oxygen containing gas such as one containing free oxygen and an inert gas can be employed.

Waste heat boiler 19 is operated at sufficient pressure to force the combustion products from boiler 19 through line 3, evaporator 2 and to tower 25. A pressure from 10 to 20 pounds per square inch absolute is satisfactory for this purpose. The lower pressure limit is suitable when an induced draft is employed to draw the waste gases out of tower 25; pressures at the upper portion of the recited range are suitable when a blower is used to supply air under pressure to reactor 8 and boiler 19.

The present invention is more fully described and illustrated in the following example. It is to be understood, however, that the invention is not to be limited to any specific form of materials or conditions set forth in the example, but is limited solely by the description in the specification and the appended claims. All parts are by weight unless otherwise specified.

EXAMPLE

In a neutral sulfite board mill, a charge of 420 short tons of birch is converted in a 24 hour period to approximately 300 short tons of bone dry wood and pulp. The cooking liquor comprises 0.15 ton of sodium sulfite and 0.04 ton of sodium carbonate, per ton of air dry pulp. Black liquor charged to evaporator 2 in the process comprises 0.54 ton of dry solids per ton of bone dry pulp, the composition of the solids being:

|  | Weight percent |
|---|---|
| Na | 16.4 |
| C | 28.11 |
| H | 3.65 |
| S | 9.47 |
| O | 42.37 |

In evaporator 2, the black liquor is concentrated to a dry solids concentration of approximately 55 percent. Air charged to burner 7 is 134 moles per hour. The temperature of burner 7 is approximately 2000° F. Products are removed from reactor 8 at 2000° F., and comprise about 1064 moles per hour included among which are (moles per hour):

| | |
|---|---|
| $Na_2CO_3$ | 48 |
| $H_2S$ | 40 |
| CO (equivalent) | 228 |

Total gas charged to waste heat boiler 19 is 1177 moles per hour. Removed from 19 through line 3 are 1217 moles per hour of gases, including 40 moles per hour of sulfur dioxide. The temperature of the gases so removed is about 600° F. Total heat recovered as steam (line 22) is 34,000,000 B.t.u./hr. Sodium sulfite removed through line 27 comprises 48 moles per hour.

Among the several advantages characterizing the present process, emphasis is given to substantial elimination of both air and water pollution. The possibility of boiler or furnace explosion is reduced to a minimum by separation of reactor (as 8) and boiler (as 19), in contrast with standard recovery boilers or furnaces. Further safety is added by eliminating the possibility of explosion in the dissolver, since the pulverized smelt (a solute) is fed as a ground, relatively cool, solid instead of a smelt and since the solute is essentially sodium carbonate instead of a mixture of sodium carbonate, sodium sulfide and varying amounts of other sodium compounds (or essentially calcium oxide or magnesium oxide instead of mixtures of oxides and sulfides).

The invention has been described in detail according to preferred materials and preferred operating conditions; however, it will be obvious to those skilled in the art that changes and modifications can be made, without departing from the spirit or scope of the invention, and it is intended in the appended claims to cover such changes and modifications.

I claim:
1. A process for recovering metal and sulfur values from a spent cooking liquor containing the same, said metal being selected from the group consisting of alkali and alkaline earth metals, comprising:
  (a) introducing said liquor in a finely divided state and an oxygen containing gas into a combustion zone to effect combustion of the liquor at a temperature greater that 1700° F., the quantity of oxygen containing gas being sufficient to maintain combustion in a reducing atmosphere, said combustion producing from the liquor an inorganic smelt residue containing the metal and a combustion gas containing hydrogen sulfide;
  (b) removing the inorganic residue smelt and the combustion gas from the combustion zone;
  (c) separating the combustion gas from the smelt;
  (d) reacting the combustion gas with an oxygen containing gas to convert the hydrogen sulfide to sulfur dioxide.
2. The process of claim 1 wherein the spent pulping liquor is introduced at an upper portion and intermediate portion of said combustion zone.
3. The process of claim 1 wherein the combustion gas from step (d) is passed in a direct heat transfer relationship with the feed to the combustion zone.
4. The process of claim 3 wherein the combustion gas after contacting the feed to the combustion zone is contacted with an absorption solution selected from the group consisting of alkali metal carbonate and alkaline earth metal hydroxide solutions to remove sulfur dioxide therefrom.
5. The process of claim 4 wherein the metal is sodium and the inorganic smelt residue contains sodium carbonate.
6. The process of claim 5 wherein the sodium carbonate is dissolved in water and employed as the absorption solution for removing the sulfur dioxide.
7. The process of claim 4 wherein the metal is magnesium and the inorganic smelt residue contains magnesium oxide.
8. The process of claim 7 wherein the magnesium oxide is contacted with water to produce a magnesium hydroxide solution and the magnesium hydroxide solution is employed for removing the sulfur dioxide.
9. The process of claim 4 wherein the metal is calcium and the inorganic smelt residue contains calcium oxide.
10. The process of claim 9 wherein the calcium oxide is contacted with water to produce a calcium hydroxide solution and the calcium hydroxide solution is employed for removing the sulfur dioxide.

References Cited
UNITED STATES PATENTS

| | | | |
|---|---|---|---|
| 2,385,955 | 10/1945 | Tomlinson | 23—48 X |
| 2,993,753 | 7/1961 | Collins | 23—48 |
| 3,073,672 | 1/1963 | Cederquist | 23—48 |
| 3,232,700 | 2/1966 | Englund et al. | 23—48 |
| 3,236,589 | 2/1966 | Reinhall et al. | 23—48 |
| 3,261,662 | 7/1966 | Axelsson | 23—48 |

OTHER REFERENCES

Lee et al.: Tappi (Technical Association of the Pulp and Paper Industry), "Chemical Recovery From Neutral Sulphite Semi-chemical Spent Liquors by the Atomized Suspension Technique," vol. 41, March 1958, pp. 110–116.

OSCAR R. VERTIZ, Primary Examiner.

G. T. OZAKI, Assistant Examiner.